United States Patent Office 2,836,490
Patented May 27, 1958

2,836,490

METHOD OF TREATING SOLUTIONS
CONTAINING METAL VALUES

Vladimir Nicolaus Mackiw and Vasyl Kunda, Ottawa, Ontario, and Wei Cheng Lin, Hull, Quebec, Canada, assignors to Sherritt Gordon Mines Limited, Toronto, Ontario, Canada, a corporation of Canada No Drawing. Application September 17, 1952
Serial No. 310,126

6 Claims. (Cl. 75—115)

This invention relates to a process for treating solutions containing metal values and sulphur compounds for the oxidation and/or decomposition of such sulphur compounds as would tend to contaminate the purity of the product metals.

Hydrometallurgical methods involving the leaching of metaliferous materials such as ores and concentrates for the extraction of the metal values and subsequent treatments of the resulting leach solutions for the recovery of the product metal or metals of interest are known in the metallurgical art.

It is found, in the gas reduction of metals from aqueous solutions, that if certain compounds of sulphur are present in the solution the purity of the product metal is reduced by contamination by sulphur. For example, in the treatment of solutions containing, in solution, values of one or more of the metals copper, nickel and cobalt, the presence of a sulphur compound having a labile sulphur atom which can be released or dissociated from the compound with which it is associated in the solution will result in the presence of an appreciable percentage of sulphur in the product metal recovered from the solution and it is difficult and relatively costly to treat the product metal to reduce the sulphur content to within prescribed tolerance limits within which the sulphur does not affect the purity of the metal.

Examples of sulphur compounds whose presence in the solution are found to contaminate the product metal recovered from the solution are thiosulphate, $S_2O_3$; polythionates, $S_xO_6$; and sulphamate.

We have found that these sulphur compounds can be converted readily by an easily executed method to sulphates, in which form they are stable and the product metal of interest can be precipitated from the solution substantially free from contamination by sulphur and safely within predetermined tolerance limits.

The method involves, in general, the step of feeding an oxygen bearing, oxidizing gas into the solution, which is preferably maintained at a temperature above about 150° F., for a period of time sufficient to convert thiosulphate and/or polythionate compounds to sulphate form. However, if sulphate is present in the solution it normally is not decomposed, or converted, to sulphate form, by the oxidation treatment. Therefore, if sulphamate is present in the solution, the method is capable of modification depending on whether it is desired to retain the sulphamate in the solution and recover it therefrom after the product metal precipitation step as a marketable product and recover the product metal contaminated to a slight extent by sulphur, or whether it is desired to convert the sulphamate to sulphate and recover the product metal substantially free from sulphur.

If it is desired to recover sulphamate from the effluent solution, the solution from the oxidation step can be filtered and passed directly to the product metal precipitation step. Alternatively, if it is desired to decompose the sulphamate and thus precipitate a product metal substantially free from sulphur, the solution is hydrolized after the oxidation step, during which the sulphamate rapidly converts to sulphate, or the oxidation and hydrolysis can be carried out simultaneously in a single step.

The method of the present invention is independent of the source of the leach solution which contains the metal values and the sulphur compound or compounds. The solution can be derived from any one of several hydrometallurgical methods for the extraction of metal values from ores and concentrates. For example, it has been found that metal values such as copper, nickel and cobalt contained in sulphide material, such as sulphide ores, concentrates and matte, can be successfully extracted with a high degree of efficiency by leaching the sulphide material directly with an acid solution, such as sulphuric acid solution, or with a strong aqueous ammonia solution, each in the presence of an oxygen bearing, oxidizing gas such as oxygen, oxygen enriched air or air, alone or in combination with one or more inert gases, the leaching operation being conducted under a superatmospheric pressure and at an elevated temperature. Under these conditions, copper, nickel and cobalt values contained in the starting material are rapidly and efficiently extracted from the starting material and are brought into solution from which they can be separately recovered.

The present method is effective for converting sulphur compounds having a labile sulphur atom which are present in the pregnant solution from the leaching step to a stable, oxidized form and permits the precipitation and recovery of the product metal from the solution substantially free from contamination by sulphur.

The terms "oxidizable sulphur compound" or "sulphur compound having a labile sulphur atom" used herein are intended to include those sulphur compounds having a labile sulphur atom in their structure which is released or dissociated, at an elevated temperature, from the sulphur compound with which it is associated in the solution and upon such dissociation or release is free to combine with metal ions which are present in the solution. Thiosulphate, polythionates having more than two sulphur atoms in their molecular structure, such as trithionate and tetrathionate, and the like, are illustrative of the sulphur compounds which are present in the pregnant solution from a leaching operation such as that described above.

The method is not restricted to the treatment of solutions containing values of a specific metal. Rather, it can be employed in the treatment of solutions containing values of several metals and at least one compound of sulphur of the class described from which it is desired to precipitate a product metal substantially free from contamination by sulphur. However, when more than one metal is present in the pregnant leach solution it usually is preferred to follow a sequence of operations by means of which each metal is selectively precipitated. For example, if only copper is present in the leach solution, the solution would be treated directly by the method of the present invention and follow the present method with the product metal precipitation step. However, if copper and nickel values or copper, nickel and cobalt values are present in the pregnant leach solution, the copper values can be separated from the solution, such as by cementation or by precipitation as copper sulphides, and the copper free solution passed to the oxidation treatment of the present invention, the precipitated copper values being separately treated for the recovery of the copper product metal.

While the method of the present invention is independent of the source of the leach solution which contains the metal values and the sulphur compound or compounds of the class described, it is described hereinafter as employed in the treatment of an aqueous ammoniacal copper-free solution containing, in solution, nickel and/or cobalt values, a sulphur compound such as thiosulphate and/or a polythionate, and ammonium sulphamate. The leach solution was derived from leaching a mineral sulphide flotation concentrate comprised of nickel sulphide, copper sulphide, cobalt sulphide and pyrrhotite, about 11% nickel, 2% copper and a small amount of cobalt. This concentrate was leached with strong aqueous ammonia at a temperature within the range of from about 150° to about 190° F. and under a pressure of from about 80 to 100 pounds per square inch. The mixture was actively agitated and an oxygen bearing, oxidizing gas was fed into the mixture during the leaching operation. The leaching operation was conducted to produce a solution containing from about 40 to about 50 grams per litre of nickel, about 8 grams of copper per litre and a small amount of cobalt. The copper values were separated from the solution, such as by the method described in detail in co-pending application Ser. No. 294,642, filed June 20, 1952, now Patent No. 2,693,405, issued November 2, 1954, to produce a substantially copper-free solution containing nickel values of the order of from about 40 to about 50 grams of nickel per litre. The solution contained, in addition to the nickel values, compounds of sulphur such as ammonium sulphate, ammonium thiosulphate, ammonium polythionates such as trithionate, and, usually, ammonium sulphamate.

The nickel values can be precipitated directly from this solution as a nickel product metal, such as by gas reduction with a reducing agent such as hydrogen. It is found, however, that such nickel product metal is contaminated by sulphur to the extent that the sulphur content of the product metal is beyond tolerance limits, that is, more than about 0.2% sulphur.

The copper-free solution containing the nickel values and the oxidized and oxidizable sulphur compounds and sulphamate, was charged to a pressure vessel such as an autoclave. The charge to the autoclave comprised: nickel, 40 to 50 grams per litre; cobalt, 1 to 2 grams per litre; sulphur as sulphate, 70 grams per litre; sulphur as sulphamate, 25 grams per litre; sulphur as thiosulphate, 0.1 to 1.5 grams per litre; sulphur as polythionate ($S_xO_6$), 0.1 to 1.0 gram per litre. The solution was heated to a temperature within the range of from about 150° F. to about 350° F., preferably about 300° F., and a partial pressure of oxygen of from about 10 to about 60 pounds per square inch above the pressure generated by the temperature of operation, or a total pressure within the range of from about 75 to about 300 pounds per square inch. The solution was actively agitated to provide maximum gas-liquid interphase and a stream of oxygen bearing, oxidizing gas such as air, oxygen enriched air, or oxygen, alone or mixed with an inert gas, was fed into the agitated mixture. These operating conditions were maintained until substantially all the oxidizable sulphur compounds were converted to sulphates, that is until, for example, the S as $S_2O_3$ and $S_3O_6$ was reduced to from about 0.01 to nil gram per litre.

The following examples illustrate the effect of temperature on the time of the oxidizing reaction:

Temperature, ° F.:     Time of retention, minutes
180 ---- 85
200 ---- 80
220 ---- 40
235 ---- 15
250 ---- 8

The following examples illustrate the effect of oxygen partial pressure on the time of retention when operating at a temperature of 250° F., the total pressure being within the range of from about 75 to about 300 pounds per square inch.

$O_2$ partial pressure, p. s. i.:     Time of retention, minutes
20 ---- 8
40 ---- 4
60 ---- 3

If air is employed as the oxidizing gas, it is preferable to withdraw continuously used air from the reaction vessel as fresh air is fed thereinto. The desired pressure is maintained during the operation and any ammonia which is withdrawn from the reaction vessel with the withdrawn air can be recovered for re-use.

If no sulphamate is present in the solution from the oxidation operation, or if it is desired to recover as sulphamate any sulphamate which is present in the solution from the product metal precipitation step, the solution can be filtered and passed directly to the product metal precipitation step. However, if this procedure is followed and sulphamate is present in the solution, the product metal from the metal precipitation step will be contaminated by sulphur and such metal may require further purification treatment.

It is preferred, therefore, when sulphamate is present in the solution, to hydrolize the solution to decompose and convert the ammonium sulphamate to ammonium sulphate. In such a case, the flow of oxygen bearing, oxidizing gas to the reaction vessel is stopped and the solution, following the oxidation step, is heated to a temperature within the range of from about 350° F. to about 500° F., preferably, of the order of from about 400 to 450° F., under an autogenous pressure of about 350 pounds per square inch. Agitation is not essential but it is preferred in that it assists in improving the heat transfer. Under these conditions, the ammonium sulphamate is rapidly hydrolyzed and converted to ammonium sulphate according to the reaction:

$$NH_4SO_3NH_2 + H_2O \rightarrow (NH_4)_2SO_4$$

The following examples illustrate the effect of temperature on the rate of hydrolysis of ammonium sulphamate:

| Temperature | Pressure, Pounds per Square Inch | Time |
|---|---|---|
| 350° F | 150 | Infinitive. |
| 400° F | 250 | 120 minutes. |
| 425° F | 320 | 90 minutes. |
| 450° F | 450 | 60 minutes. |
| 475° F | 600 | 20 minutes. |
| 500° F | 750 | 5 minutes. |

Under the prescribed conditions, the sulphamate is rapidly decomposed and converted to sulphate and the product metal can be recovered from the subsequent metal precipitation step substantially free from contamination by sulphur, of the order of, for example, 0.1% sulphur or less.

The method of the present invention can be employed, with advantage, in the treatment of acid solutions. For example, a nickel ammonium sulphate solution having a pH value of the order of, for example, pH 3 to pH 4, was treated at a temperature within the range of from about 200° to about 400° F., preferably about 350° F., at an oxygen partial pressure within the range of from about 20 to about 200 pounds per square inch. An oxygen bearing, oxidizing gas such as air, oxygen enriched air, or oxygen alone, was fed into the reaction vessel and the solution was actively agitated for a period of about one-half hour. At the end of this period, the oxidizable sulphur compounds were found to be less than 0.01 gram per litre. Any sulphamate present in the solution was decomposed by hydrolysis and converted to sulphate in the manner described above.

It has been found also that the oxidation of the unoxidized sulphur compounds and the hydrolysis of the sulphamate can be effected simultaneously in a single operation by treating the solution in a closed reaction vessel at a temperature of at least about 400° F. and preferably within the range of from about 400° F. to about 500° F. at a partial pressure of oxygen of at least about 10 pounds per square inch above the autogenous pressure generated at the temperature of operation. Air can be employed conveniently as the oxygen bearing oxidizing gas and the solution is agitated sufficiently to ensure maximum heat transfer and gas-liquid interphase. Under these conditions, the oxidation and hydrolysis reactions proceed simultaneously very rapidly. The time of retention of the solution in the reaction vessel can be controlled easily to permit continuous operation, or it can be operated as a batch process if desired.

It is found, in the operation of the oxidation and hydrolysis steps that the concentration of metals in the solution should be maintained safely below that at which there would be any danger of crystallization of metal sulphates either at the operating temperature or at lower temperatures. For example, in treating ammoniacal solutions containing nickel, the nickel content of the solution should be maintained at less than about 50 grams per litre, for example, at about 44 grams per litre, to avoid any danger of precipitation of nickel ammonium sulphate in the reaction vessel or in the pipe lines. The metal concentration of the solution can be controlled readily by adding water or steam to either or both the oxidation or hydrolysis steps to replace the water lost by evaporation during operation.

The method of the present invention possesses a number of important advantages. It can be operated very conveniently and inexpensively as a continuous process, the reaction vessel or vessels being designed to provide the required time of retention for the single oxidation stage, the single oxidation and hydrolysis stage, or the consecutive oxidation and hydrolysis stages. Alternatively, it can be operated conveniently as a batch process. The oxidizable sulphur compounds are readily oxidized to sulphates under the prevailing oxidizing conditions and any sulphamate present is decomposed and converted to sulphate in the hydrolysis of the solution, thus ensuring the precipitation and recovery of substantially sulphur free product metal in the following product metal precipitation stage.

It will be understood, of course, that modifications can be made in the operation of the method without departing from the scope of the appended claims.

What we desire to protect by Letters Patent of the United States is:

1. The method of treating a clarified aqueous ammoniacal solution substantially free from solids and containing in solution dissolved values of at least one non ferrous metal and at least one oxidizable sulphur compound selected from the group consisting of thiosulphate and polythionates which comprises the steps of maintaining the temperature of the solution in a reaction vessel of from about 150° F. to about 350° F. and at a pressure above about 75 pounds per square inch, agitating the solution, feeding an oxygen-bearing, oxidizing gas into the solution, continuing the treatment for a period of time sufficient to obtain substantially complete conversion of oxidizable sulphur compounds to sulphates, and thereafter precipitating dissolved metal values from said solution as product metal substantially free from sulphur.

2. The method of treating a clarified aqueous ammoniacal solution substantially free from solids and containing in solution dissolved values of at least one metal selected from the group consisting of nickel, copper and cobalt and at least one oxidizable sulphur compound selected from the group consisting of thiosulphate and polythionates which comprises the steps of maintaining the temperature of the solution in a reaction vessel at a temperature within the range of from about 150° F. to about 350° F. and at a pressure above atmospheric pressure, agitating the solution, feeding an oxygen-bearing, oxidizing gas into the solution, continuing the treatment for a period of time sufficient to obtain substantially complete conversion of oxidizable sulphur compounds to sulphates, and thereafter precipitating dissolved metal values from said solution as product metal substantially free from sulphur.

3. The method of treating a clarified aqueous ammoniacal solution substantially free from solids and containing in solution dissolved values of at least one metal selected from the group consisting of nickel, copper and cobalt, ammonium sulphamate and at least one oxidizable sulphur compound selected from the group consisting of thiosulphate and polythionates, which comprises the steps of maintaining the temperature of the solution in a reaction vessel above about 350° F. and at a partial pressure of oxygen of at least about 10 pounds per square inch, agitating the solution, feeding an oxygen-bearing, oxidizing gas into the solution, and continuing the treatment for a period of time sufficient to obtain substantially complete conversion of oxidizable sulphur compounds to sulphates and the hydrolysis of sulphamate to sulphate.

4. The method of treating a clarified aqueous ammoniacal solution substantially free from solids and containing in solution dissolved values of at least one metal selected from the group consisting of nickel, copper and cobalt, ammonium sulphate, ammonium sulphamate and at least one oxidizable sulphur compound selected from the group consisting of thiosulphate and polythionates, which comprises the steps of maintaining the temperature of the solution in a reaction vessel above about 350° F. and at a partial pressure of oxygen of at least about 10 pounds per square inch, agitating the solution, feeding an oxygen-bearing, oxidizing gas into the solution, and continuing the treatment for a period of time sufficient to obtain substantially complete conversion of oxidizable sulphur compounds to sulphates and the hydrolysis of sulphamate to sulphate.

5. The method of treating a clarified aqueous ammoniacal solution substantially free from solids and containing in solution dissolved values of at least one metal selected from the group consisting of nickel, copper and cobalt, ammonium sulphamate and at least one oxidizable sulphur compound selected from the group consisting of thiosulphate and polythionates which comprises the steps of maintaining the temperature of the solution in a reaction vessel within the range of from about 150° F. to about 350° F. and at a pressure above atmospheric pressure, agitating the solution, feeding an oxygen-bearing, oxidizing gas into the solution, continuing the treatment for a period of time sufficient to obtain substantially complete conversion of oxidizable sulphur compounds to sulphates, and increasing the temperature of the solution to and maintaining it above about 350° F. for a period of time sufficient to obtain substantially complete conversion of ammonium sulphamate to ammonium sulphate.

6. The method of treating a clarified aqueous ammoniacal solution substantially free from solids and containing in solution dissolved values of at least one metal selected from the group consisting of nickel, copper and cobalt, ammonium sulphate, ammonium sulphamate and at least one oxidizable sulphur compound selected from the group consisting of thiosulphate and polythionates which comprises the steps of maintaining the temperature of the solution in a reaction vessel within the range of from about 150° F. to about 350° F. and at a pressure above atmospheric pressure, agitating the solution, feeding an oxygen-bearing, oxidizing gas into the solution, continuing the treatment for a period of time sufficient to obtain substantially complete conversion of oxidizable sulphur compounds to sulphates, and increasing the temperature of the solution to and maintaining it above about 350° F. for a period of time sufficient to obtain substantially complete conversion of ammonium sulphamate to ammonium sulphate.

(References on following page)

References Cited in the file of this patent

UNITED STATES PATENTS

| | | |
|---|---|---|
| 981,451 | McKechnie et al. | Jan. 10, 1911 |
| 1,364,573 | Moore | Jan. 4, 1921 |
| 2,367,239 | Renzoni | Jan. 16, 1945 |
| 2,424,866 | Udy | July 29, 1947 |
| 2,568,963 | McGauley et al. | Sept. 25, 1951 |
| 2,588,265 | McGauley | Mar. 4, 1952 |
| 2,647,820 | Forward | Aug. 4, 1953 |
| 2,647,827 | McGauley | Aug. 4, 1953 |
| 2,687,953 | Kenny et al. | Aug. 31, 1954 |
| 2,693,404 | Mackiw | Nov. 2, 1954 |
| 2,726,934 | Forward et al. | Dec. 13, 1955 |

FOREIGN PATENTS

| | | |
|---|---|---|
| 100,488 | Great Britain | May 14, 1917 |
| 122,479 | Hungary | Dec. 15, 1939 |

OTHER REFERENCES

The Canadian Mining and Metallurgical Bulletin, for January 1952, Montreal, pages 49–53.